(12) United States Patent
Kramer

(10) Patent No.: US 10,301,157 B1
(45) Date of Patent: May 28, 2019

(54) TREE CARRYING APPARATUS AND METHOD

(71) Applicant: Shane Kramer, Defiance, OH (US)

(72) Inventor: Shane Kramer, Defiance, OH (US)

(*) Notice: Subject to any disclaimer, the term of this patent is extended or adjusted under 35 U.S.C. 154(b) by 0 days.

(21) Appl. No.: 16/023,909

(22) Filed: Jun. 29, 2018

(51) Int. Cl.
*B66F 9/18* (2006.01)
*B65G 7/12* (2006.01)
*A01G 23/04* (2006.01)

(52) U.S. Cl.
CPC .................. *B66F 9/18* (2013.01); *B65G 7/12* (2013.01); *A01G 23/043* (2013.01)

(58) Field of Classification Search
CPC ...... A01G 9/088; A01G 23/04; A01G 23/043; B66F 9/18; B66F 9/186; B66F 9/187; B65G 7/12
USPC ................... 294/67.1; 414/23, 607
See application file for complete search history.

(56) References Cited

U.S. PATENT DOCUMENTS

| | | | | |
|---|---|---|---|---|
| 2,431,589 A * | 11/1947 | Shuler, Jr. | ................ | B66F 9/12 108/55.3 |
| 2,558,388 A | 6/1951 | Richardson | | |
| 2,696,317 A | 12/1954 | Toffolon | | |
| 2,707,846 A | 5/1955 | Beseler | | |
| 3,053,405 A * | 9/1962 | Holmberg, Jr. | ........... | B66F 9/12 294/92 |
| 3,319,815 A * | 5/1967 | Vik | ........................ | B66F 9/184 294/110.1 |
| 4,009,898 A | 3/1977 | Hampton | | |
| 4,073,175 A * | 2/1978 | Seamon | .................. | B66F 9/187 294/68.3 |
| 4,114,766 A | 9/1978 | Decker et al. | | |
| 4,454,683 A | 6/1984 | Schauer et al. | | |
| 4,626,012 A * | 12/1986 | Weldele | .................... | B66C 1/10 294/67.1 |
| 4,666,360 A | 5/1987 | Harms et al. | | |
| 5,217,274 A | 6/1993 | Ilchuk | | |
| 5,221,176 A | 6/1993 | Allen et al. | | |
| 5,496,143 A | 3/1996 | Breyer | | |
| 5,655,873 A | 8/1997 | Jobmann et al. | | |
| 6,371,543 B1 | 4/2002 | Fujikawa et al. | | |
| 6,942,442 B1 | 9/2005 | Green | | |
| 7,198,312 B2 | 4/2007 | Blaho | | |
| 7,214,025 B2 * | 5/2007 | Rudolph | .................. | B66F 9/18 186/63 |
| 8,844,449 B2 | 9/2014 | Merit et al. | | |

(Continued)

FOREIGN PATENT DOCUMENTS

| EP | 81305472.3 A2 | 6/1982 |
|---|---|---|
| GB | 2089762 A | 6/1982 |
| WO | PCT/AU91/00569 | 6/1992 |

OTHER PUBLICATIONS https://pfeifer.de/emag/pfeifer_complett_2016_17/index.html#/106.

*Primary Examiner* — Dean J Kramer
(74) *Attorney, Agent, or Firm* — BakerHostetler

(57) ABSTRACT

Systems and methods use one or more frame configured for arrangement on moving equipment to safely and efficiently move elongate loads such as trees without risking damage to the loads or requiring multiple laborers. An apparatus includes first and second portions defining first and second openings. The first and second portions are linked by a bridge portion. First and second couplers are disposed on each of the first and second portions respectively, and attach a support for carrying an elongate load.

15 Claims, 8 Drawing Sheets

(56) References Cited

U.S. PATENT DOCUMENTS

| 9,828,224 B1* | 11/2017 | Hamilton | B66F 9/12 |
| 2002/0110446 A1* | 8/2002 | Smith | B66F 9/18 |
| | | | 414/607 |
| 2009/0074542 A1 | 3/2009 | Jay | |

* cited by examiner

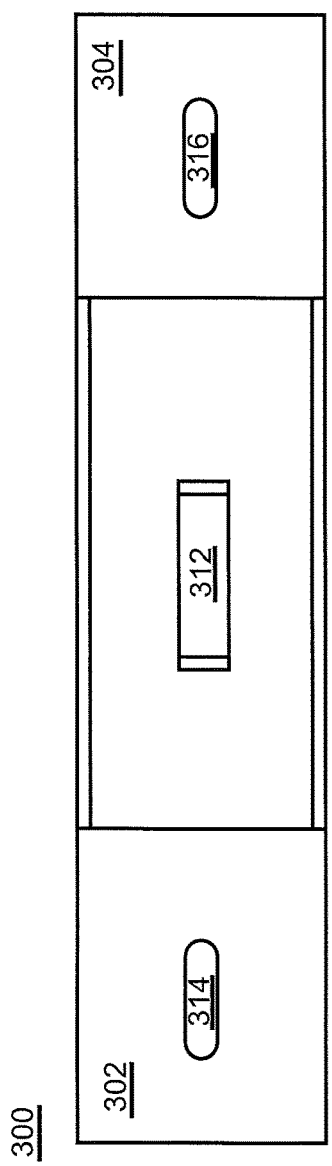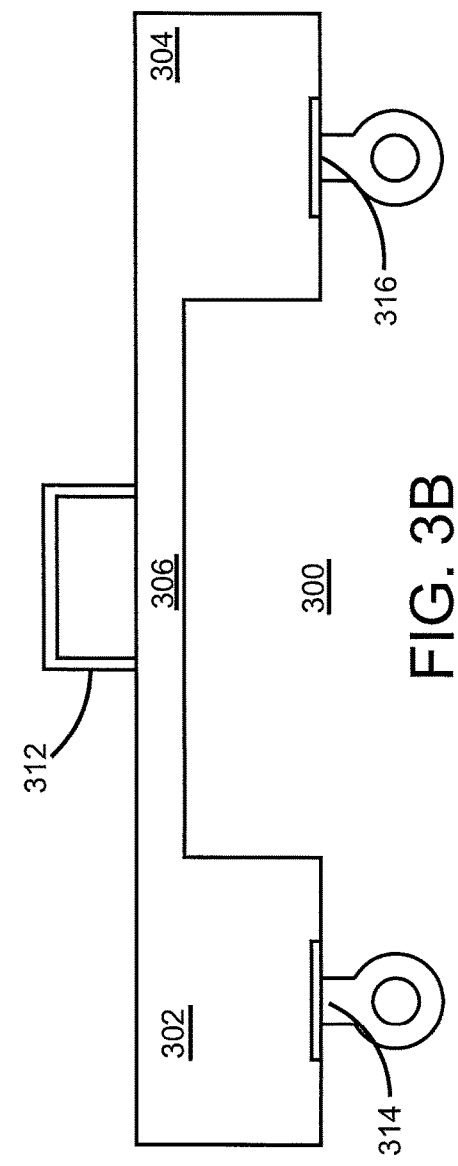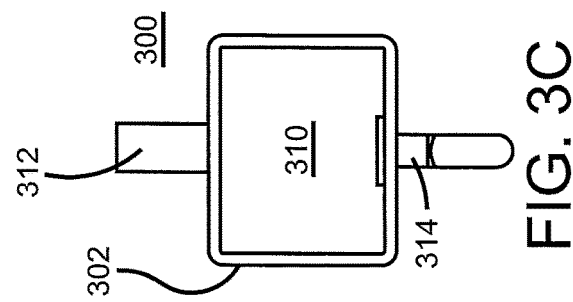

US 10,301,157 B1

TREE CARRYING APPARATUS AND METHOD

TECHNICAL FIELD

The subject innovation generally relates to carrying trees. The subject innovation more specifically concerns apparatuses and methods for conveniently and safely transporting trees without risking damage to trunks or limbs.

BACKGROUND

Trees may be moved for a variety of reasons. For example, tree nurseries or garden centers may grow trees to certain heights or ages to provide for planting that will result in faster landscape transformation than if seeds were planted. In another example, a property owner may wish to relocate a tree to avoid its destruction when it grows too large for a given location. Other reasons abound.

Regardless of reason, movement of trees is a challenging proposition. Trees are unwieldy elongate loads, constructed of roots (frequently balled into a rootball), a trunk (which can be heavy and dangerous in larger trees, or at risk of snapping in smaller trees), and branches with leaves which are easily broken. Transportation of trees poses risk of damaging the tree and is hazardous to laborers. Frequently, more than one laborer is required to move the tree.

It would be beneficial to have safe, efficient techniques for moving trees and similarly sized and shape loads presenting comparable problems.

SUMMARY

In an embodiment, a system, comprises a frame. The frame includes a first portion defining a first opening and a second portion defining a second opening. The second opening is aligned with the first opening along a common axis, and the second opening and the first opening are axially spaced relative to each other to define a channel. The frame also includes a first coupler supported on the first portion, a second coupler supported on the second portion, and a support configured to carry an elongate load attached to the first coupler and second coupler.

In another embodiment, a method comprises providing a first frame. The first frame includes a first portion defining a first opening, a second portion defining a second opening, a first coupler supported on the first portion, and a second coupler supported on the second portion. The second opening is aligned with the first opening along a common axis, and the second opening and the first opening are axially spaced relative to each other to define a channel. The method further comprises providing a second frame including a third portion defining a third opening, a fourth portion defining a fourth opening, a third coupler supported on the third portion, and a fourth supported on the fourth portion. The fourth opening is aligned with the third opening along a common axis, and the fourth opening and the third opening are axially spaced relative to each other to define a second channel. The method further comprises providing a support configured to carry an elongate load attached to the first coupler, the second coupler, the third coupler, and the fourth coupler; mounting the first frame over a first component of moving equipment; mounting the second frame over a second component of the moving equipment; and operatively coupling an elongate load including a tree ball and a tree trunk to the first frame and the second frame. Operative coupling of the elongate load to the first frame utilizes the first coupler and the second coupler. Operative coupling of the elongate load to the second frame utilizes the third coupler and fourth coupler.

These and other embodiments are described in greater detail below, and this summary should not be construed as limiting or including any required element of systems and methods disclosed herein.

BRIEF DESCRIPTION OF THE DRAWINGS

The invention may take physical form in certain parts and arrangements of parts, an embodiment of which will be described in detail in the specification and illustrated in the accompanying drawings which form a part hereof, and wherein:

FIGS. 3A, 3B, and 3C illustrate engineering views of another sleeve for carrying a tree;

DETAILED DESCRIPTION OF ILLUSTRATIVE EMBODIMENTS

To provide convenient and safe transport of trees, capable of being performed by a single laborer while avoiding damage to a rootball, trunk, or limbs, apparatuses and methods are disclosed for carrying and moving a tree. The disclosed solution allows a single laborer to connect portions of the apparatus to lifting or moving equipment (e.g., a forklift, skidsteer etc.) according to an assembly sequence not requiring other laborers. The load is securely attached but capable of shifting (e.g., rocking, rotating) during lifting or movement to aid with stability. In general, a frame is provided, or two or more frames are provided for use in pairs or groups, for interaction with the lifting apparatus, such as a forklift, crane et cetera, with one or more carriers that extend from the frame to support or attach to the rootball or a container in which the rootball is received. When in operation with a system for carrying a tree (or other appropriate load), the frame generally defines an opening to receive the trunk, branches or other portions of the tree extending upwardly from the rootball. The frame may be constructed as a single unitary member or multiple members. In the example, the frame includes two members that can be positioned independently on either side of the trunk above the rootball. To facilitate use with the lifting member, the frame includes a channel or opening that receives a portion of the lifting apparatus. Considering a forklift, as an example, frame defines a channel to receive at least one of the tines of the forklift. In the example shown, where the frame includes a pair of members, each member defines a channel that receives one of the tines of the forklift. In particular, the frame is constructed as a pair of sleeves that define the tine receiving channels. Because there is no cross member connecting two or more sleeves being used, a tree trunk can extend up between the sleeves without coming into contact with the sleeves or other portions of the system used to move the tree. The arrangement of beams and coupled elements can be modified to allow the tree to clear all portions, avoiding damage to the bark and branches which extend beyond the diameter of the rootball.

While the solution is predominantly shown in conjunction with forklifts, it is understood that similar techniques utilizing sleeves and/or similar concepts can be utilized with, e.g., certain hand trucks or dollies, cranes, backhoes, bulldozers, et cetera, as well as waterborne or airborne vehicles or systems. Further, while sleeves herein are depicted as arranged over rigid beams when in use, it is understood that flexible members can be arranged through the sleeves (e.g., chains lowered from crane and arranged through two or more sleeves), or that non-integral beams can be arranged through the sleeves (e.g., cables lowered from crane and attached to rigid rods arranged through sleeves), to utilize the apparatuses and techniques disclosed herein.

Figure 1:
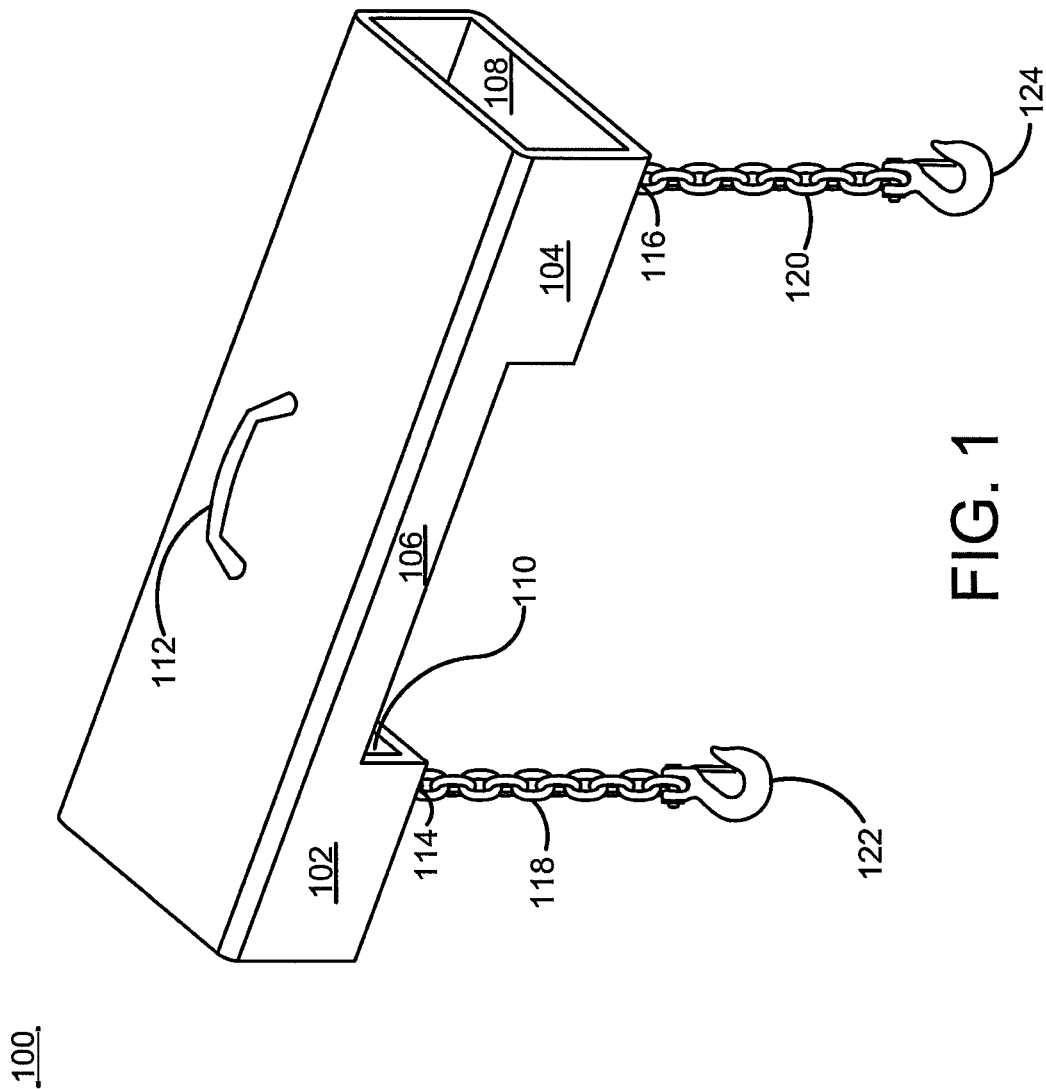
FIG. 1 illustrates a perspective view of a sleeve for carrying a tree.

FIG. 1 illustrates a perspective view of frame 100 for carrying a tree. Frame 100 is configured to fit over a beam and support an elongate load including a tree ball and tree trunk. In embodiments the beam can be a forklift tine.

Frame 100 includes first portion 102 and second surround portion 104 that define an opening that receives a portion of the lifting apparatus, such as a beam, forklift tine, flexible member (e.g., a chain or rope), and the like. Frame 100 may include a bridge portion 106 disposed between the first portion and the second portion. Bridge portion 106 may share the same cross section as first and second portions to form a continuous cross section along the length of the frame. Alternatively, as shown, bridge portion 106 may have a different cross section. In the example, first and second portion each have a rectangular cross section defining rectangular openings 108 and 110. The bridge portion 106 spaces the first portion 102 and the second portions 104 from each other along a common axis. The bridge portion 106 extends axially from the upper surface of first portion to the upper surface of second portion defining a cutout portion 115 between the first and second portion. In this way, bridge portion 106 is located above the beam when it is in the channels 108,110 providing an elongated supporting surface when the beam is acting upwardly. As shown, bridge portion 106 may include edges that extend downward partially with the sidewalls of the first and second portions to form a generally c-shaped cross section. Cutout portion 115 allows visibility into the channel defined by openings 108 and 110. The inside of surrounding portion 102 and surrounding portion 104, beginning at openings 108 and 110, can be seen from additional angles, and arrangement of frame 100 can be made more precise. Such visibility may be provided in a continuous channel by cutting holes in the center of the channel to provide operator visibility.

Figure 6:
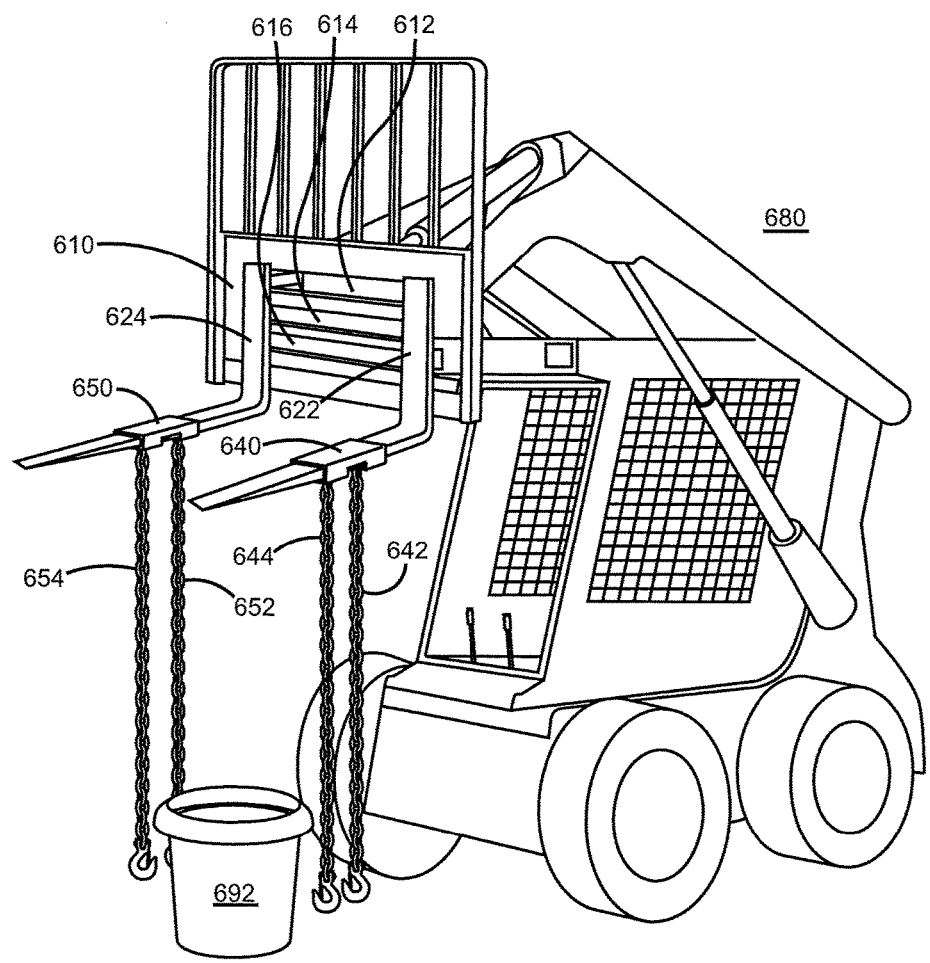
FIG. 6 illustrates an example system configured to carry a load.

Supports or carriers designed to support or carry the rootball are attached to frame 100. To facilitate attachment of these supports or carriers, frame 100 includes a first coupling point 114 and a second coupling point 116. These coupling points may be located anywhere on frame 100. In the example, first coupling point 114 and second coupling point 116 are located on at first portion 102 and second portion 104, respectively. These coupling points allow the attachment of various elements that can directly or indirectly bear a load such as an elongate load including a tree having a trunk and branches. The coupling points may be openings, hooks, loops, tethers, or other members that facilitate the attachment of these elements. In the example, the coupling points include a coupler that extends downward from the lower surface of first portion 102 and second portion 104. Coupler may include a loop (FIG. 2) welded to the frame; an eye (FIG. 3) threaded into frame; or a tab that extends downward from frame (FIG. 6).

With reference to FIG. 1, the support includes one or more flexible members. It will be understood that support may include rigid members as well. In FIG. 1, a first flexible member 118 and second flexible member 120 are respectively coupled to first coupling point 114 and second coupling point 116. While two flexible members are shown, it will be understood that a single member extending from first coupling point may be looped around the rootball and attached to second coupling point. While flexible members herein are generally illustrated as chains, it is understood that alternatives, such as cables, wires, ropes, cords, lines, et cetera, can be utilized. In embodiments, some or all of members 118 and 120 can be inflexible materials; for example, rigid bars or rods could be connected in movable or fixed fashions in alternative embodiments. First flexible member 118 can be mechanically coupled with attachment element 122 and second flexible member 120 can be mechanically coupled with attachment element 124. Attachment elements 122 and 124 can be, e.g., hooks, snaps, carabiners, or other elements which allow for easy attachment or detachment of other elements, and in embodiments include features for positive control and safety (e.g., preventing accidental decoupling). Flexible members 118 and 120 can include other similar or dissimilar attachment elements opposite attachment elements 122 and 124 for removably coupling flexible members 118 and 120 with first and second coupling points 114 and 116.

Frame 100 as illustrated optionally includes handle 112. Handle 112 can be used to carry or position frame 100 during deployed (e.g., on a beam) or stowed (e.g., off a beam) handling. In an alternative embodiment, frame 100 includes no handle 112. In embodiments, frame 100 can include a safety link mechanically coupled to first portion 102 or another portion. The safety link can be configured to couple with a safety line, which can in turn couple to a structure supporting the beam (e.g., the mast of a forklift). The safety line can prevent frame 100 from moving beyond a certain distance from the mast when attached, ensuring frame 100 does not slide off the beam and/or that a load is kept close to the structure to avoid tipping. In embodiments, safety lines can be flexible (e.g., allowing movement in one direction as the line flexes, but not another after it is fully extended) or rigid (e.g., fixing frame 100 at a length approximating the length of the safety line). In an embodiment, handle 112 can also serve as the safety link. In alternative embodiments, one or more safety links can be provided in addition to or in the absence of handle 112, at any location on frame 100.

In one or more embodiments, an anti-slip treatment is applied to at least one of a first inside of first portion 102 and/or a second inside of second portion 104. For example, viewing through openings 108 or 110, an anti-slip treatment can be applied to a top (e.g., side of bridge 106) inside portion, one or both side inside portions, and/or a bottom inside portion (e.g., side opposite bridge 106) to resist movement of frame 100 on a beam. The anti-slip treatment can be a material applied (e.g., rubber, adhesive, plastic) and/or modification to the structure of frame 100 (e.g., texturing, knurling).

Frame 100 and/or its parts can be formed of materials appropriate for bearing loads such as trees. Construction can be uniform or heterogeneous, and may include but are not limited to metals, polymers, carbon fiber products, and others. In embodiments, frame 100 is formed from monolithic construction. In embodiments, frame 100 is assembled from disparate parts (by, e.g., welding, adhering, fusing, riveting, screwing, bolting, or other techniques). In a particular embodiments, one part can be formed of a first material and another part can be formed of a second material.

Figure 2:
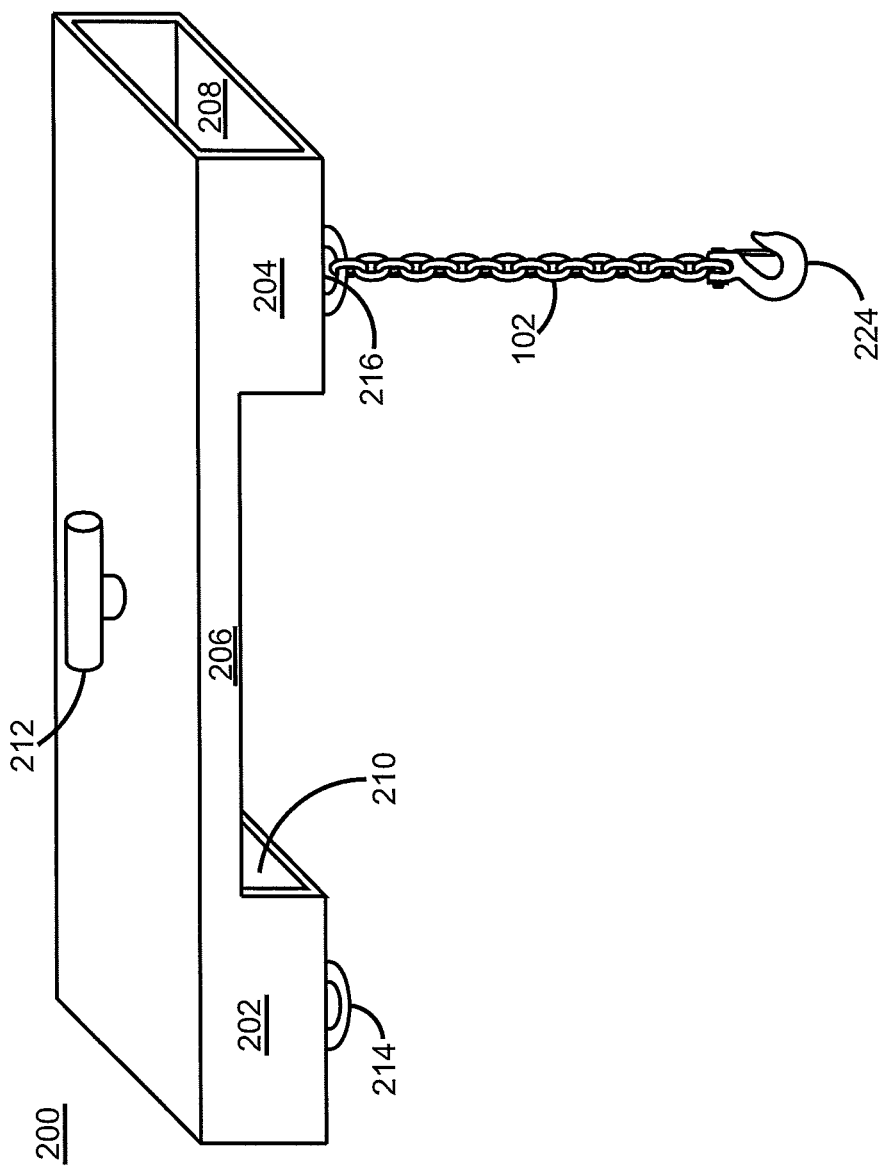
FIG. 2 illustrates a perspective view of another sleeve for carrying a tree.

FIG. 2 illustrates an alternative embodiment of a sleeve 200 configured for arrangement around a mechanical element (e.g., a beam) which can directly or indirectly move a load. Sleeve 200 includes first surround portion 202, second portion 204, bridge portion 206, first opening 208, second opening 210, carrying handle 212, first coupling point 214, second coupling point 216, flexible member 220, and attachment element 224. Sleeve 200 illustrates different geometries (e.g., radii, lengths, widths) than frame 100.

FIGS. 3A, 3B, and 3C illustrate engineering views of another sleeve 300 for carrying a tree. Sleeve 300 includes first surround portion 302, second portion 304, bridge portion 306, first opening 308, second opening 310, carrying handle 312, first coupling point 314, second coupling point 316. Sleeve 300 illustrates different geometries (e.g., radii, lengths, widths) than sleeves 100 and 200. Sleeves disclosed herein can have various alternative arrangements in terms of geometry without departing from the scope or spirit of the innovation. Further, while FIGS. 3A, 3B, and 3C include engineering markup for particular dimensions, these dimensions can be varied to accommodate different needs or preferences based on systems with which sleeve 300 (or other sleeves) are integrated.

Figure 4:
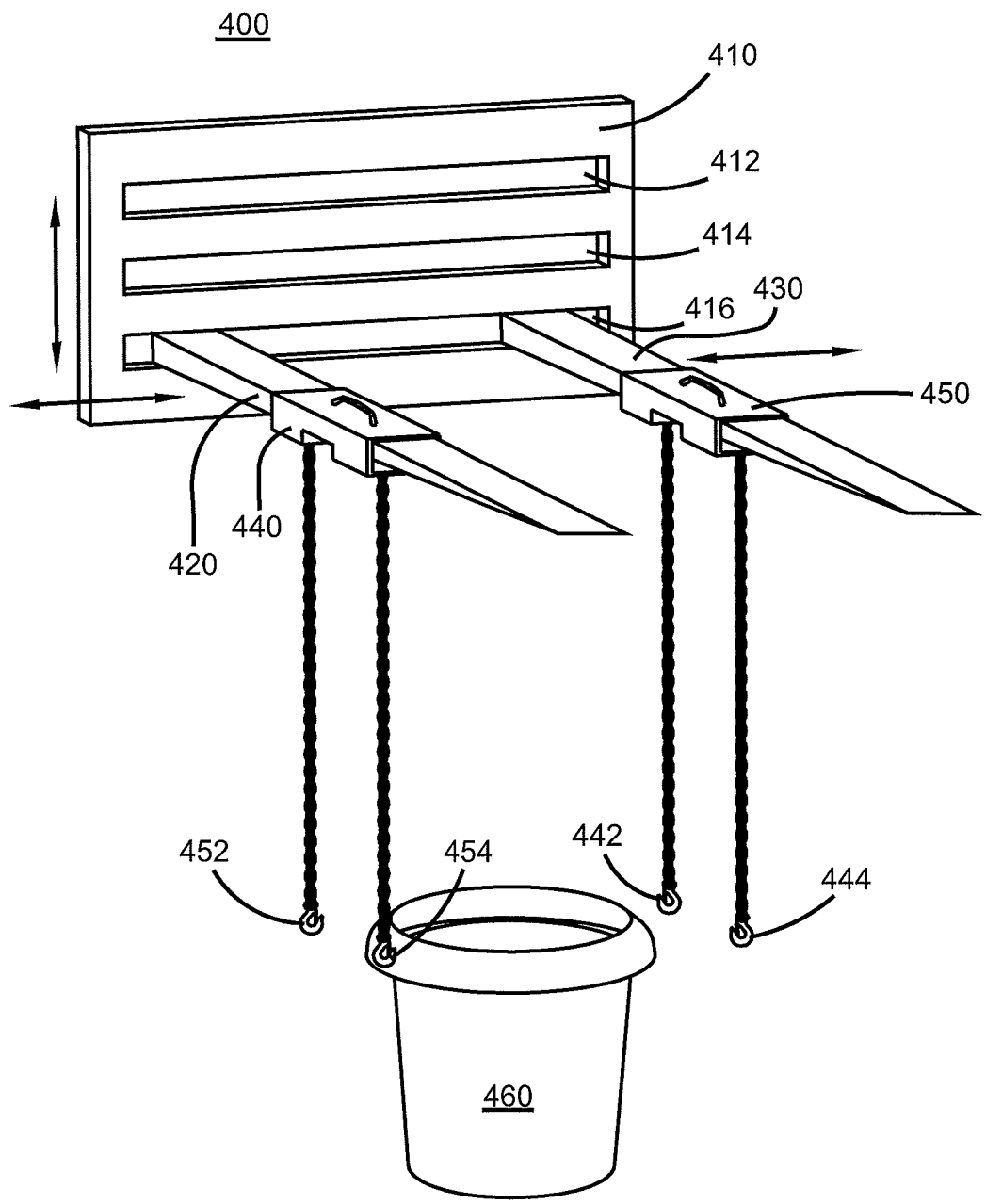
FIG. 4 illustrates an example apparatus for carrying a tree.

FIG. 4 illustrates an example apparatus 400 for carrying a tree. Apparatus 400 includes structure 410, which can be, e.g., a mast of a forklift. Structure 410 includes a variable arrangement for beams 420 and 430 (e.g., forks) such that they can be moved up or down, relative to structure 410 and by selectively engaging them with rows 412, 414, and/or 416. More, beams 420 and 430 can be moved left or right, or nearer together or farther apart, through changing positions in rows 412, 414, and 416. In embodiments, rows 412, 414, and/or 416 can include one or more stops or positioning elements to secure beam 420 and/or beam 430 in a particular lateral position within the respective row.

Sleeve 440 is arranged about beam 420 and sleeve 450 is arranged about beam 430. Flexible members 442 and 444 are mechanically coupled with sleeve 440 and flexible members 452 and 454 are mechanically coupled with sleeve 450. Flexible members 442, 444, 452, and 454 are all coupled with support 460, which is configured to carry the elongate load. Support 460 can be, e.g., a rope, cable, chain, or other loop (which can be fixed in circumference or variable using e.g., a slip knot, eyelet, zip tie, or other self-tightening or removable loop structure); a platform; or other arrangements configured to support weight. In a particular embodiment, a loop is configured to have a circumference greater than a portion of a rootball, but less than its largest circumference, allowing a portion of the rootball to rest in the loop without slipping through.

In embodiments, one of the flexible members has a different coupling-to-load length different than a second flexible member. The coupling to load length can be defined as the length of a flexible member from its attachment point on either of sleeves 440 or 450 to its attachment point on support 460. Varying the coupling-to-load length among flexible members 442, 444, 452, and 454 allows for particular orientations of support 460 which will in turn orient the elongate load. For example, if flexible members 442 and 452 are longer than flexible members 444 and 454, support 460, and the elongate load, may be tilted toward structure 410. This could assist with, e.g., minimizing leverage (shorter moment arm), maneuverability (lowering peak of elongate load and/or limiting how far it extends beyond structure 410), slipping or drop safety (elongate load biased to tip toward structure 410 during loss of control), et cetera. Alternatively all flexible members may be made the same length, or support 460 could be biased in another direction (e.g., for stability when transporting a tree over uneven surfaces).

In embodiments, beams 420 and 430 may be the same or different, and sleeves 440 and/or 450 may be symmetrical or of different dimension, construction or design. Regardless of symmetry or asymmetry in beams, sleeves, or other components, various geometries and arrangements can be configured to particular loads or systems (e.g., means of locomotion on which beams 420 and 430 are arranged).

Figure 5:
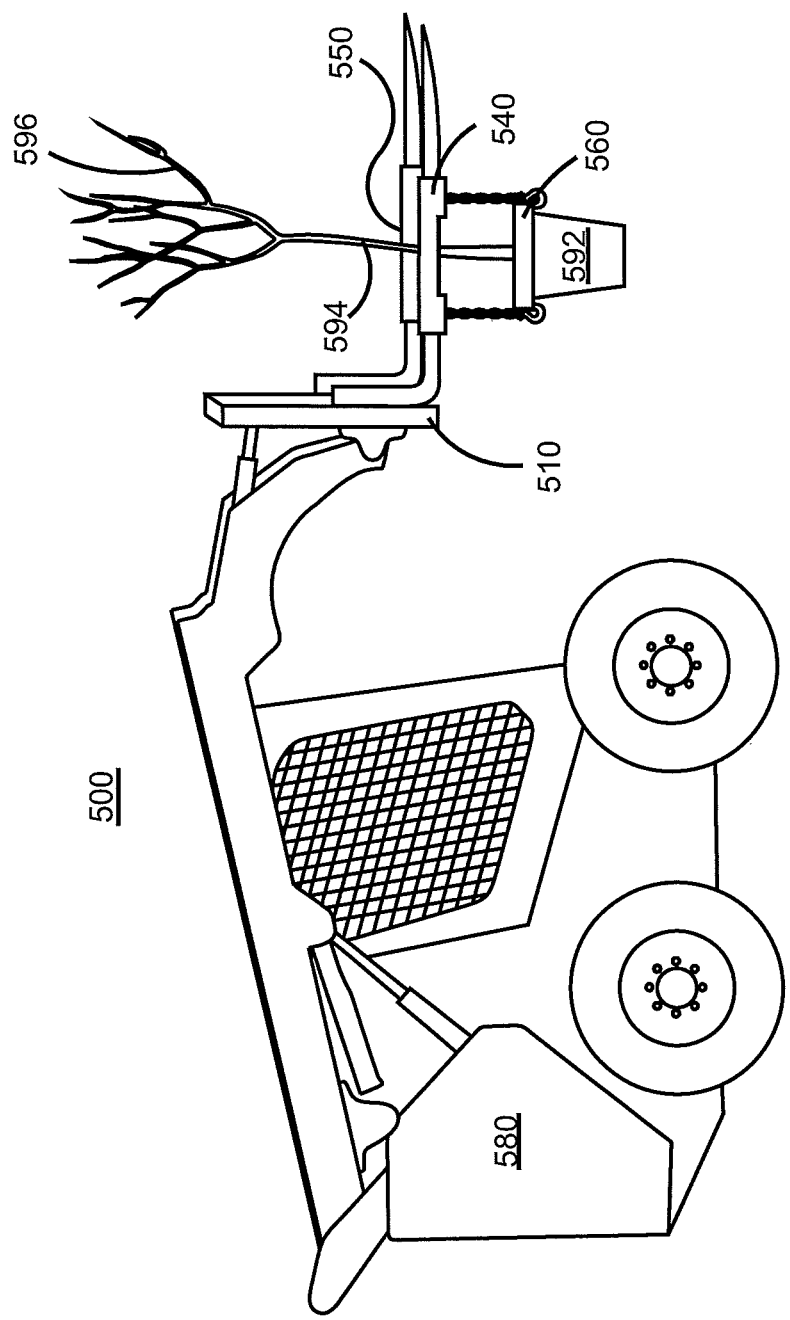
FIG. 5 illustrates an example system carrying a tree.

While FIG. 4 and other drawings herein generally depict a two-beam, two-sleeve arrangement, it is understood that in alternative embodiments one, three, or more beams may be present; two or more sleeves may be arranged on a beam; three or more coupling points may be provided per sleeve; a sleeve can have two or more bridge portions; two or more flexible members may be attached to a single coupling point; and so forth, such that alternative arrangements utilizing the concepts FIG. 5 illustrates an example system 500 carrying a tree. System 500 includes vehicle 580 having structure 510 (e.g., a forklift mast). Sleeves 540 and 550 are operatively coupled to structure 510 through intervening elements, such that they (and loads attached thereto) are raised, lowered, and moved using vehicle 580. Support 560 is mechanically coupled to sleeves 540 and 550 (e.g., using flexible members) which supports a tree including rootball 592, trunk 594, and branches 596.

As can be appreciated, the geometries of a tree make it challenging to safely transport this delicate, living cargo. In smaller trees, rootball 592 may constitute a substantial portion of its overall mass, while in larger trees, trunk 594 may constitute an equal or greater proportion of the tree's mass in comparison to rootball 592 and/or branches 596. These possibilities make for awkward handling. The entire tree is covered in bark, damage to which can harm the tree. Damage to branches 596 and/or leaves attached thereto can also reduce the tree's overall health. For trees with a smaller trunk 594, the trunk itself may be easily snapped. When using equipment such as forklifts, which are typically made of materials like metal, or when otherwise using forces sufficient to move a heavy tree, such damage can easily occur.

As can be appreciated in system 500, this damage can be avoided, and the tree safely moved, using the disclosed solution. Rootball 592 is positively controlled using support 560, which can be angled or arranged to position rootball 592 and other portions of the tree for stability and clearance of forks or other hard portions. The bundling of rootball 592, flexibility of roots, and dirt frequently included in rootball 592 make this portion the easiest to support while limiting risk of damage. The trunk itself need not interact at any point with elements of vehicle 580, and the distance between sleeves 540/550 and support 560 can be arranged such that branches 596 clear any portion of vehicle 580 or its attachments. In this manner, damage to the tree can be avoided. More, because support 560 can be arranged prior to coupling with sleeves 450 and 550, a single laborer can safely arrange the system without assistance.

FIG. 6 illustrates an example system 600 configured to carry a load. System 600 includes vehicle 680 having structure 610 (e.g., a forklift mast). Structure 610 includes a plurality of columns 612, 614, and 616 configured to arrange forks 622 and 624 at different widths (and optionally different heights with respect to structure 610).

Sleeves 640 and 650 are configured to arrange about forks 622 and 624. Flexible members 642 and 644 are shown coupled with sleeve 640, and flexible members 652 and 654 are shown coupled with sleeve 650. Load 692 is shown decoupled from flexible members 642, 644, 652, and 654. Load 692 as depicted can be attached as-is, or a tree's rootball can be placed partially or entirely therein to facilitate carriage of a tree using system 600.

Figure 7:
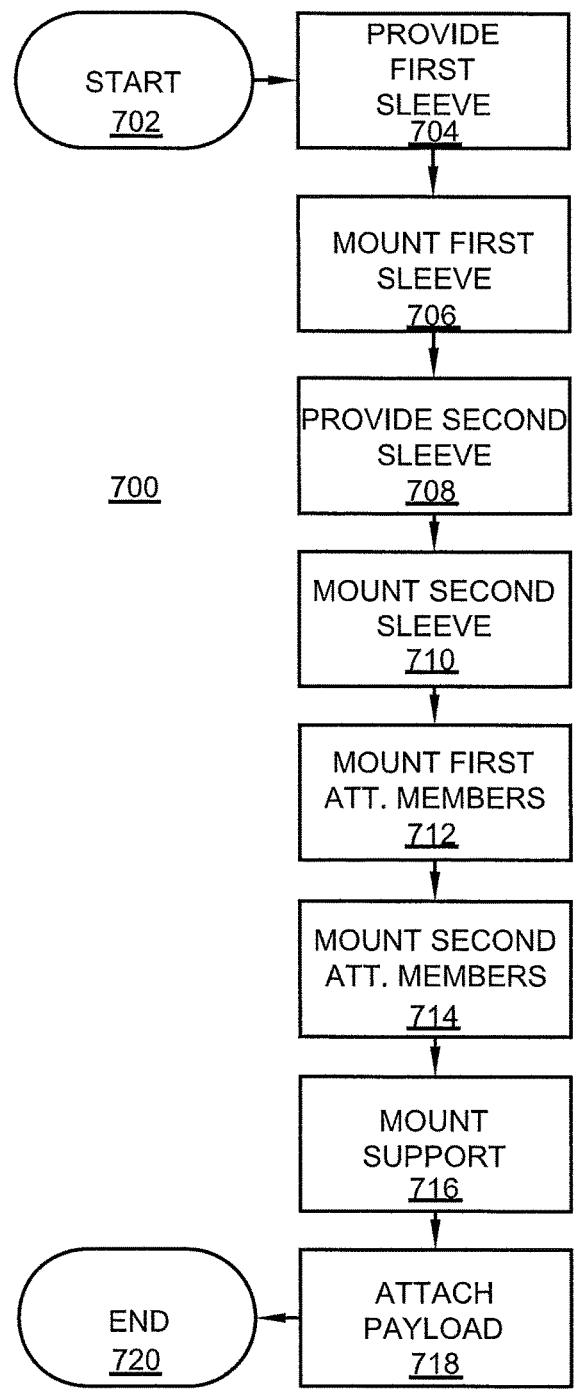
FIG. 7 illustrates a flowchart of an example methodology for carrying a tree.

FIG. 7 illustrates a flowchart of an example methodology 700 for carrying a tree. Methodology 700 begins at 702 and proceeds to 704 where a first sleeve is provided and mounted to a structure at 706. At 708 a second sleeve is provided, which is mounted to the structure at 710. At 712, first attaching members, which can be flexible members, are mounted to the first sleeve, and at 714, second attaching members, which can be flexible members, are mounted to the second sleeve. At 716 a support (e.g., a loop) can be mounted to the attaching members, and at 718, a load may be attached using the support. In embodiments, attachment of the load precedes mounting of the support inasmuch as the load and support are already coupled or arranged. Thereafter, at 720, methodology 700 ends.

Figure 8:
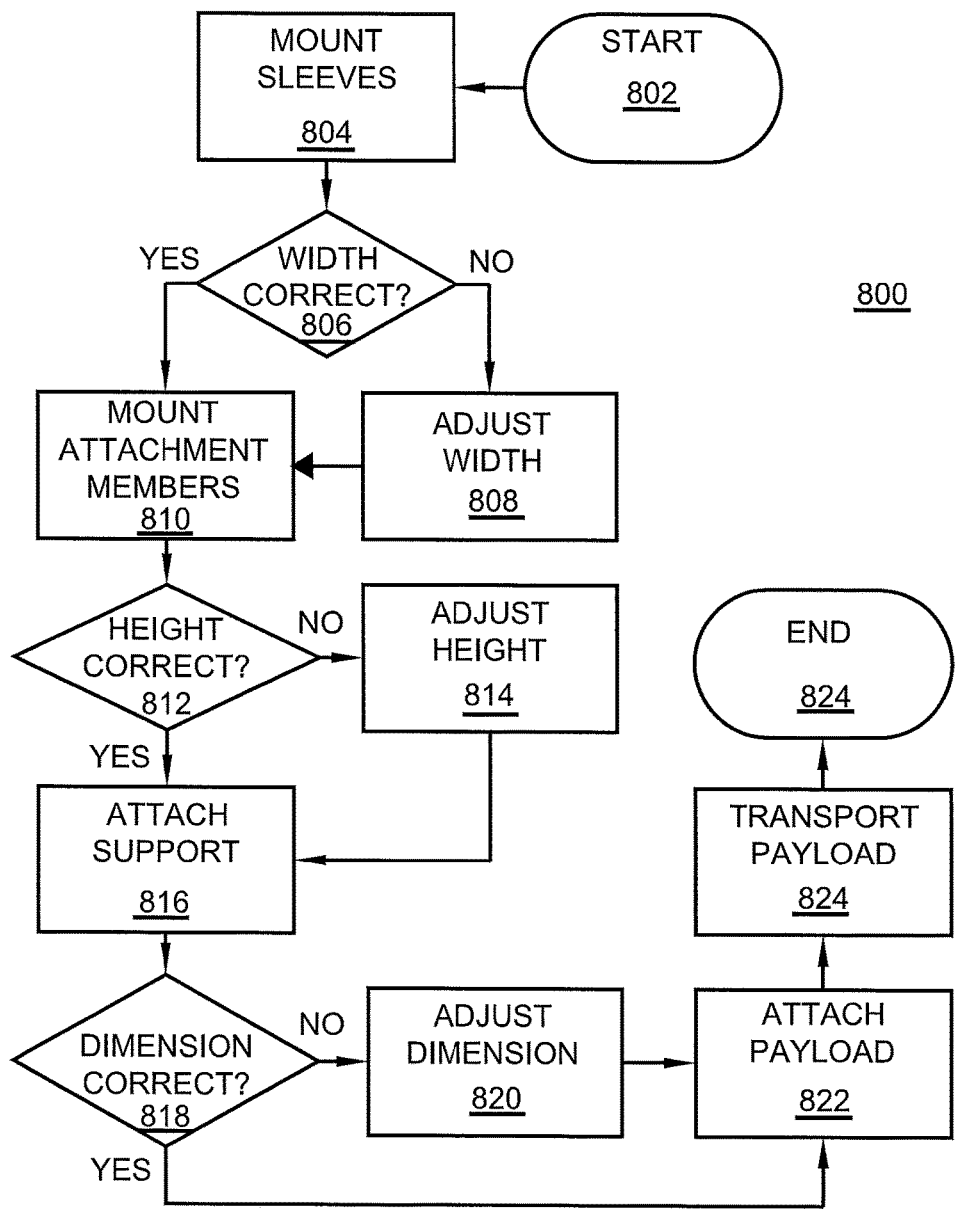
FIG. 8 illustrates a flowchart of another example methodology for carrying a tree.

FIG. 8 illustrates a flowchart of another example methodology 800 for carrying a tree. Methodology 800 begins at 802 and proceeds to 804 where sleeves are mounted to a structure. At 806 a determination is made as to whether the width of the sleeves as mounted on the structure is appropriate to accommodate a load. If not, methodology 800 proceeds to 808 where the width is adjusted. Thereafter, or if the determination at 806 returns positive, methodology 800 proceeds to 810 where attachment members are mounted to the sleeves. The attachment members can include flexible members as described herein.

At 812 a determination is made as to whether the attachment members establish the proper height for to carry a payload. If not, methodology 800 proceeds to 814 where one or more of the attachment members can be adjusted to determine a distance between the payload and a sleeve to which it is attached. In embodiments, one or more attachment members (or pairs of attachment members) can be set to different lengths than others to facilitate a particular load orientation in view of the vehicle and terrain to be traversed. Thereafter, or if the determination at 812 returns positive, methodology 800 proceeds to 816 where a support can be attached to the attachment members.

At 818, a determination can be made as to whether a dimension of the support is correct. In embodiments, this can include determining whether a circumference (or other dimension such as diameter) of a loop is appropriate for the payload to be carried. If not, methodology 800 proceeds to 820 where the dimension can be adjusted. Thereafter, or the determination at 818 returns positive, methodology 800 proceeds to 822 where a payload can be attached. In embodiments, aspects herein can be re-ordered, as the payload is previously coupled with at least the support, which is connected to the attachment members thereafter.

At 824, once all aspects are properly adjusted and attached, the payload can be transported. Adjustments to width, height, and/or support dimensions can be based on, e.g., dimensions of an elongate load such as a tree. In embodiments, the width can be adjusted to a trunk dimension, the height can be adjusted to a relative branch height (e.g., position of branches on trunk), and the support dimension can be adjusted to a rootball dimension. Thereafter, alternative aspects can be performed in a reverse order to decouple the payload, and/or methodology 800 can end at 826. In this manner, elongate loads such as trees or other difficult-to-transport loads can be safely and securely attached for transportation by a single laborer with risk of damage to the load.

In embodiments of methodologies 700 and 800, other aspects can be performed. For example, an additional step can include attaching a safety line between a safety link and the structure. The safety link can be coupled to one of the first fork sleeve and the second fork sleeve. In embodiments, the safety line can be shorter than a beam to which the one of the first fork sleeve and/or second fork sleeve is attached.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., does not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and, also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
   a frame, the frame including:
   a first portion defining a first opening;
   a second portion defining a second opening, wherein the second opening is aligned with the first opening along a common axis, and wherein the second opening and the first opening are axially spaced relative to each other to define a channel;
   a bridge portion extending between the first portion and the second portion, wherein the bridge portion includes a generally flat member that extends from an upper surface of the first portion to an upper surface of the second portion defining a cutout portion beneath the bridge portion and between the first portion and second portion;
a first coupler supported on the first portion;
a second coupler supported on the second portion; and
a support configured to carry an elongate load attached to the first coupler and second coupler.

2. The system of claim 1, wherein the bridge portion includes a pair of edges that extend downward partially into the cutout portion, the edges conforming to a cross-section of the channel defined by the first portion and the second portion.

3. The system of claim 1, further comprising:
a carrying handle of the frame mechanically coupled to the bridge portion.

4. The system of claim 1, wherein the support includes a first flexible member attached to the first coupler and a second flexible member attached to the second coupler.

5. The system of claim 1, wherein the first coupler includes a first loop extending downward from a lower surface of the first portion and wherein the second coupler includes a second loop extending downward from a lower surface of the second portion.

6. The system of claim 1, further comprising:
a second frame, the second frame including:
a third portion defining a third opening;
a fourth portion defining a fourth opening, wherein the fourth opening is aligned with the third opening along a common axis, and wherein the fourth opening and the third opening are axially spaced relative to each other to define a second channel;
a third coupler supported on the third portion; and
a fourth supported on the fourth portion,
wherein the support is further configured to carry the elongate load attached to the third coupler and fourth coupler.

7. The system of claim 1, further comprising:
an anti-slip material applied to at least one of a first inside of the first portion and a second inside of the second portion.

8. A method, comprising:
providing a first frame, the first frame including a first portion defining a first opening, a second portion defining a second opening, a first coupler supported on the first portion, and a second coupler supported on the second portion, wherein the second opening is aligned with the first opening along a common axis, and wherein the second opening and the first opening are axially spaced relative to each other to define a channel;
providing a second frame, the second frame including a third portion defining a third opening, a fourth portion defining a fourth opening, a third coupler supported on the third portion, and a fourth supported on the fourth portion, wherein the fourth opening is aligned with the third opening along a common axis, and wherein the fourth opening and the third opening are axially spaced relative to each other to define a second channel;
providing a support configured to carry an elongate load attached to the first coupler, the second coupler, the third coupler, and the fourth coupler;
mounting the first frame over a first component of moving equipment;
mounting the second frame over a second component of the moving equipment; and
operatively coupling an elongate load including a tree ball and a tree trunk to the first frame and the second frame, wherein operatively coupling the elongate load to the first frame utilizes the first coupler and the second coupler, and wherein operatively coupling the elongate load to the second frame utilizes the third coupler and fourth coupler.

9. The method of claim 8, further comprising:
providing a first flexible member, a second flexible member, a third flexible member, and a fourth flexible member;
coupling the first flexible member to the first coupler;
coupling the second flexible member to the second coupler;
coupling the third flexible member to the third coupler; and
coupling the fourth flexible member to the fourth coupler,
wherein the elongate load including the tree ball and tree trunk are supported by the first flexible member, the second flexible member, the third flexible member, and the fourth flexible member.

10. The method of claim 9, wherein the first flexible member has a first coupling-to-load length different than a second coupling-to-load length of at least one of the second flexible member, the third flexible member, and the fourth flexible member.

11. The method of claim 10, further comprising:
determining an orientation of the elongate load, wherein one of the first coupling-to-load length and the second coupling-to-load length is selected based on the orientation.

12. The method of claim 9, further comprising:
providing a support configured to carry the elongate load including the tree ball and tree trunk; and
operatively coupling the support to the first frame using the first flexible member and the second flexible member; and
operatively coupling the support to the second frame using the third flexible member and the fourth flexible member.

13. The method of claim 8, further comprising:
determining a dimension of the elongate load including the tree ball and the tree trunk; and
adjusting a support dimension of the support based on the dimension of the elongate load.

14. The method of claim 8, wherein one of the first frame and the second frame has a carrying handle, and wherein mounting the one of the first frame and the second frame is completed using the carrying handle.

15. The method of claim 8, wherein the first frame has a first bridge portion extending between the first portion and the second portion, and wherein the second frame has a second bridge portion extending between the third portion and fourth portion.

* * * * *